Patented Sept. 10, 1935

2,013,804

UNITED STATES PATENT OFFICE 2,013,804

PRODUCTION OF PURE LECITHIN

Gustav Klein, Mannheim, and Karl Tauboeck, Ludwigshafen-on-the-Rhine, Germany, assignors to Winthrop Chemical Company, Inc., New York, N. Y., a corporation of New York No Drawing. Application June 17, 1933, Serial No. 676,320. In Germany June 21, 1932

10 Claims. (Cl. 260—99.20)

The present invention relates to the production of pure lecithin.

The methods hitherto known of preparing lecithin from impure solutions thereof in organic solvents have proved inefficient by giving but poor yields of unchanged lecithin, because the use of solutions either of calcium bromide or cadmium chloride as precipitants entailed incomplete precipitation. Besides this, the removal of the precipitating salts which are injurious to the human organism was not only difficult but imperfect, the product, therefore, being unsuitable for food and pharmaceutical preparations. In the case of other methods the working conditions have usually led, in varying degrees, to a decomposition of the lecithin, which is a very sensitive substance, with the result that preparations produced therefrom would contain, on the one hand, very little unchanged lecithin and on the other hand, cleavage products having an undesirable physiological action.

We have now found that good yields of pure lecithin can be obtained from lecithin containing substances, including crude lecithin, by first practically completely removing any water present in said substances, and then extracting the lecithin from the said initial materials, which usually contain albumen and other foreign substances, besides the lecithin, with the aid of a solvent for said lecithin, the lecithin then being precipitated from the resulting solution by means of an inorganic oxidic sol, and finally separated from the precipitated product.

The removal of water is preferably carried out at a low temperature, such as between about zero and about 10° C., preferably between about 5 and about 10° C., for example by means of dry acetone or of a current of dry air. Acetone is employed in an amount of about 10 times the weight of the initial materials. The subsequent extraction of the lecithin is carried out by means of an anhydrous organic, preferably aliphatic solvent, such as methanol, ethanol, diethyl ether, petrol ether, chloroform or carbon tetrachloride, or of mixtures thereof. This extraction is advantageously performed at comparatively low temperatures, such as between about 30 and about 40° C., while excluding light and oxygen, and preferably at a reduced pressure, while employing the solvent in an amount of about 5 times the weight of the initial materials free from water. The said inorganic, oxidic sols comprise for example silicic acid sol and sols from oxidic compounds of non-alkali forming metals, such as aluminium, iron, zinc, tin, cadmium, copper, chromium and zirconium. The said sols from oxidic compounds of non-alkali forming metals may be prepared for example according to copending application Ser. No. 667,690, filed April 24th, 1933, by Walter Ziese and Kaspar Pfaff. The silicic acid sols may be prepared for example according to U. S. P. 1,835,420. Sols from silicic acid or from oxidic aluminium and iron compounds are preferably employed.

The advantages of the method according to this invention over the methods hitherto known are that at no stage of the process the lecithin suffers decomposition or cleavage and that the precipitation is practically quantitative. The removal of the precipitants from the product is readily, and also quantitatively, carried out. Even if, however, traces of the precipitants should remain in the lecithin, the consumption of preparations containing such lecithin would have no injurious effect upon the human body, as small quantities of the said substances have no physiological action.

The process according to this invention is preferably carried out for example by first freeing the substance containing lecithin, as for example fresh or dried egg yolk, brain substance or the like, from water by repeated treatment with acetone while avoiding temperatures above about 10° C. and excluding light and oxygen, then subjecting the resulting mass containing albumen to extraction with ethyl alcohol in an atmosphere free from oxygen and under reduced pressure and finally adding at between about 10 and about 20° C. an ethyl alcoholic oxidic aluminium sol to the alcoholic lecithin solution. Instead of using a ready made oxidic aluminium sol, an alcoholic solution of an aluminium salt, such as aluminium chloride, sulphate or phosphate, may be used, such an amount of an alkali, such as aqueous or gaseous ammonia, or a dilute aqueous solution of sodium, potassium or lithium hydroxide or carbonate, then being added prior to or after its addition to the alcoholic lecithin solution so that the oxidic sol is formed in the alcoholic solution. The said oxidic aluminium sol has a two-fold precipitating action on the dissolved lecithin, namely by reason of its properties as a colloidal adsorbent and as the sol of a polyvalent metal compound. The resulting precipitate containing the lecithin forms a jelly-like mass. This is finely dispersed in an organic solvent, such as absolute ethanol or methanol, and then treated with an alcoholic solution of an alkali or with gaseous ammonia. The aluminium hydroxide thus formed is filtered off, and the alcoholic solution is concentrated by evaporation under reduced pressure. By adding acetone to this concentrated alcoholic solution a good yield of pure lecithin is obtained; the precipitation is preferably completed by the addition of some calcium chloride or magnesium chloride.

In a similar manner, pure lecithin may be recovered from vegetable crude lecithin, such as is contained in vegetable oils as for example bean oil, or from brain or marrow of vertebrate animals.

The following examples will further illustrate the nature of this invention, but the invention is not restricted to these examples.

*Example 1*

Fresh egg yolk is repeatedly treated at between 5° and 10° C. with acetone in a cooled vessel in order to remove water. The resulting mass is then subjected to extraction with anhydrous ethyl alcohol at a pressure of 40 millimetres of mercury at about 30° C. while excluding light and oxygen. By the addition of ethyl alcoholic oxidic aluminium sol containing between 10 and 20 per cent of $Al_2O_3$ to the alcoholic extract, the lecithin is precipitated in the form of a complex compound, which, after filtration, is suspended in about 5 times its weight of ethyl alcohol, chloroform, or carbon tetrachloride, whereupon, while warming slightly up to about 40° C., gaseous ammonia is introduced, and the deposited aluminium hydroxide is filtered off. After inspissating the resulting solution under a pressure of about 40 millimetres of mercury, acetone is added whereby the lecithin is precipitated in the form of an almost white powder. The lecithin obtained has an entirely neutral reaction, and contains neither free acid nor chlorine; it does not act haemolytically. From one hundred fresh egg yolks about 50 grams of lecithin are obtained.

*Example 2*

100 grams of a crude phosphatide obtained from soya bean oil are dissolved in ethyl ether or carbon tetrachloride at about zero centigrade while excluding light and oxygen, 250 grams of an ethyl alcoholic silica sol containing between 5 and 10 per cent of $SiO_2$ being then added. The resulting jelly-like white precipitate is subjected to extraction with diethyl ether, and the resulting solution is concentrated in vacuo, acetone is added whereby the free lecithin is precipitated. From 100 grams of phosphatide 60 grams of pure lecithin are obtained.

*Example 3*

Fresh beef's brains are repeatedly treated with acetone at about 10° C. in order to remove water. The resulting mass is then subjected to extraction with anhydrous methanol at a pressure of about 35 millimetres of mercury and at about 30° C., while excluding light and oxygen. The resulting methyl alcoholic solution is then incorporated with an ethyl alcoholic oxidic iron sol, prepared according to the said application Ser. No. 667,690. The resulting precipitate is suspended in chloroform, and gaseous ammonia is led into the suspension. The precipitated iron hydroxide is removed by filtration, the remaining solution is inspissated in vacuo and then incorporated with acetone. The lecithin is thus practically completely precipitated and filtered off.

What we claim is:—

1. The process for the production of pure lecithin which comprises removing water from a substance containing lecithin, extracting the water-free substance by means of an organic solvent, incorporating the resulting solution with an inorganic oxidic sol, thus precipitating the lecithin, and then separating the pure lecithin from the precipitate.

2. The process for the production of pure lecithin which comprises removing water from a substance containing lecithin, extracting the water-free substance by means of an organic solvent at temperatures below the boiling point of the solvent and while excluding light and oxygen, incorporating the resulting solution with an inorganic oxidic sol, thus precipitating the lecithin, and then separating the pure lecithin from the precipitate.

3. The process for the production of pure lecithin which comprises removing water from a substance containing lecithin, extracting the water-free substance by means of an organic, aliphatic solvent, incorporating the resulting solution with an inorganic oxidic sol, selected from the group consisting of sols of oxidic compounds of non-alkali forming metals and silicic acid sol, thus precipitating the lecithin, and then separating the pure lecithin from the precipitate.

4. The process for the production of pure lecithin which comprises removing water from a substance containing lecithin, extracting the water-free substance by means of an anhydrous low molecular aliphatic alcohol at temperatures below the boiling point of the solvent and while excluding light and oxygen, incorporating the resulting solution with an inorganic oxidic sol, selected from the group consisting of sols of oxidic compounds of non-alkali forming metals and silicic acid sol, thus precipitating the lecithin, and then separating the pure lecithin from the precipitate.

5. The process for the production of pure lecithin which comprises removing water by extraction with acetone from a substance containing lecithin, extracting the same by means of anhydrous ethyl alcohol at temperatures below the boiling point of the solvent and while excluding light and oxygen, incorporating the resulting ethyl alcoholic solution with an inorganic oxidic sol selected from the group consisting of sols of oxidic compounds of non-alkali forming metals and silicic acid sol, thus precipitating the lecithin, and then separating the pure lecithin from the precipitate.

6. The process for the production of pure lecithin which comprises removing water from a substance containing lecithin, extracting the water-free substance by means of anhydrous ethyl alcohol at temperatures below the boiling point of the solvent and while excluding light and oxygen, incorporating the resulting ethyl alcoholic solution with an oxidic aluminium sol, thus precipitating the lecithin, and then separating the pure lecithin from the precipitate by suspending said precipitate in an organic solvent, incorporating the resulting suspension with an alkali, filtering off the aluminium hydroxide so formed, and precipitating the pure lecithin by means of acetone.

7. The process for the production of pure lecithin which comprises removing water from a substance containing lecithin, extracting the water-free substance by means of anhydrous ethyl alcohol at temperatures below the boiling point of the solvent and while excluding light and oxygen, incorporating the resulting solution with silicic acid sol, thus precipitating the lecithin, and then separating the pure lecithin from the precipitate by extracting the resulting precipitate by means of diethyl ether, concentrating the resulting solution and precipitating the pure lecithin by incorporating the concentrated ethereal solution with acetone.

8. The process for the production of pure lecithin which comprises removing water from a substance containing lecithin, extracting the water-free substance by means of an organic solvent at a temperature from about 30° to about 40° C. and while excluding light and oxygen, incorporating the resulting solution with an inorganic oxidic sol, thus precipitating the lecithin, and then separating the pure lecithin from the precipitate.

9. The process for the production of pure lecithin which comprises removing water from a substance containing lecithin, extracting the water-free substance by means of anhydrous ethyl alcohol at a temperature from about 30° to about 40° C. and while excluding light and oxygen, incorporating the resulting ethyl alcoholic solution with an oxidic aluminium sol, thus precipitating the lecithin and then separating the pure lecithin from the precipitate by suspending said precipitate in an organic solvent, incorporating the resulting suspension with an alkali, filtering off the aluminium hydroxide so formed, and precipitating the pure lecithin by means of acetone.

10. The process for the production of pure lecithin which comprises removing water from a substance containing lecithin, extracting the water-free substance by means of anhydrous ethyl alcohol at a temperature from about 30° to about 40° C. and while excluding light and oxygen, incorporating the resulting solution with silicic acid sol, thus precipitating the lecithin, and then separating the pure lecithin from the precipitate by extracting the resulting precipitate by means of diethyl ether, concentrating the resulting solution and precipitating the pure lecithin by incorporating the concentrated etheral solution with acetone.

GUSTAV KLEIN.
KARL TAUBOECK.